United States Patent [19]
Wilfert et al.

[11] 3,818,211
[45] June 18, 1974

[54] COVER PANE FOR REAR LIGHTS OF VEHICLES, ESPECIALLY OF MOTOR VEHICLES

[75] Inventors: Karl Wilfert, Gerlingen-Waldstadt; Hans Götz, Sindelfingen, both of Germany

[73] Assignee: Daimler-Benz Aktiengesellschaft, Stuttgart-Unterlurkhein, Germany

[22] Filed: June 30, 1972

[21] Appl. No.: 268,079

[30] Foreign Application Priority Data
July 2, 1971    Germany............................ 2133076

[52] U.S. Cl................ 240/8.3, 240/106.1, 280/152
[51] Int. Cl.............................................. B60g 1/30
[58] Field of Search............... 240/7.1 R, 8.3, 106.1, 240/8.1, 8.2; 280/152, 153, 159

[56]         References Cited
        UNITED STATES PATENTS
2,184,804   12/1939   Northup........................... 240/8.3 X
2,314,710   3/1943    Keller .............................. 240/8.3 X
2,380,691   7/1945    Gross................................ 240/8.3 X
2,925,487   2/1960    Beach ................................. 240/8.3

FOREIGN PATENTS OR APPLICATIONS
812,148     4/1959    Great Britain...................... 240/8.3

*Primary Examiner*—Joseph F. Peters, Jr.
*Attorney, Agent, or Firm*—Craig & Antonelli

[57]             ABSTRACT
A cover pane for rear lights of vehicles, especially of motor vehicles, in which the surface of the cover pane is approximately meandershaped as viewed in vertical cross section to reduce the effect of soiling.

13 Claims, 3 Drawing Figures

COVER PANE FOR REAR LIGHTS OF VEHICLES, ESPECIALLY OF MOTOR VEHICLES

The present invention relates to a cover pane for rear lights of vehicles, especially of motor vehicles, which is so constructed that a complete dirtying or soiling of the light emission area does not take place even when driving under unfavorable weather and road conditions.

It is known that when driving on wet and dirty roads, the rear lights of motor vehicles can soil to such an extent that the safety of noticeability, i.e., the safety of being able to observe the emission of light stemming from the rear lights decreases considerably.

The cause for this soiling resides in that intensive roller-shaped air eddies or vorteces with preferably horizontal axis disposed transversely to the driving direction form to the rear of the rear end of driving vehicles. Dirt and dust particles are torn along by this eddy flow are are deposited in part on the cover panes of the rear lights.

The present invention is therefore concerned with the task to achieve with simplest possible means at least a reduction on this soiling and therewith to increase the traffic safety.

A cover pane for rear lights of vehicles, especially of motor vehicles is therefore proposed whereby according to the present invention the outer surface of the cover pane is constructed approximately meander-shaped, as viewed in a vertical cross section.

It is achieved by the meander-shaped or also rib-shaped construction of the outer surface of the cover pane that the dirt particles thrown out of the aforedescribed eddy or vortex flows practically do not impinge and cover the recessed surfaces of the cover panes so that with a corresponding proportioning of the projecting ribs one half of the entire rear light surface remains practically free from dirt.

For the subsequent change-over of the vehicle, it may be advantageous if the cover pane according to the present invention is constructed as attachment which is adapted to be mounted over a customary flat cover pane.

Accordingly, it is an object of the present invention to provide a cover pane for rear lights of vehicles, especially of motor vehicles which avoids by simple means the aforementioned shortcomings and drawbacks encountered in the prior art.

Another object of the present invention resides in a cover pane for rear lights of vehicles, especially motor vehicles, which minimizes the soiling thereof when driving on wet and dirty roads and thereby increases the traffic safety.

A further object of the present invention resides in a cover pane for rear lights of vehicles which assures sufficient emission of light through at least part of its surfaces notwithstanding considerable soiling due to dirt thrown up by the driving vehicle.

Still another object of the present invention resides in a cover pane of the type described above which can be subsequently installed without great difficulties into already existing types of vehicles.

These and further objects, features, and advantages of the present invention will become more apparent from the following description when taken in connection with the accompanying drawing which shows, for purposes of illustration only, one embodiment in accordance with the present invention, and wherein.

Figure 1:
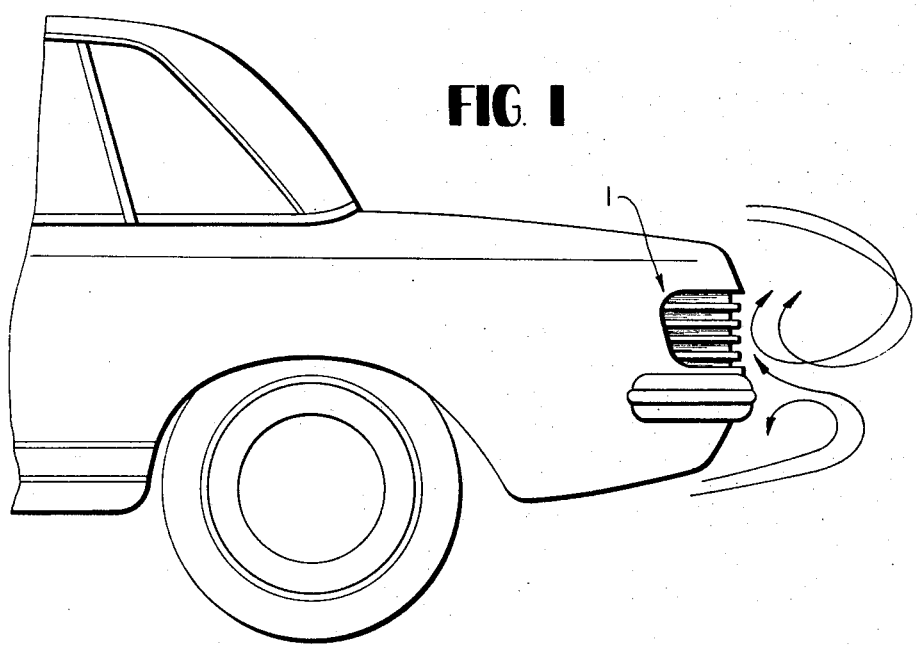
FIG. 1 is a side view of the rear part of a passenger motor vehicle equipped with a rear light cover pane in accordance with the present invention.
Figure 2:
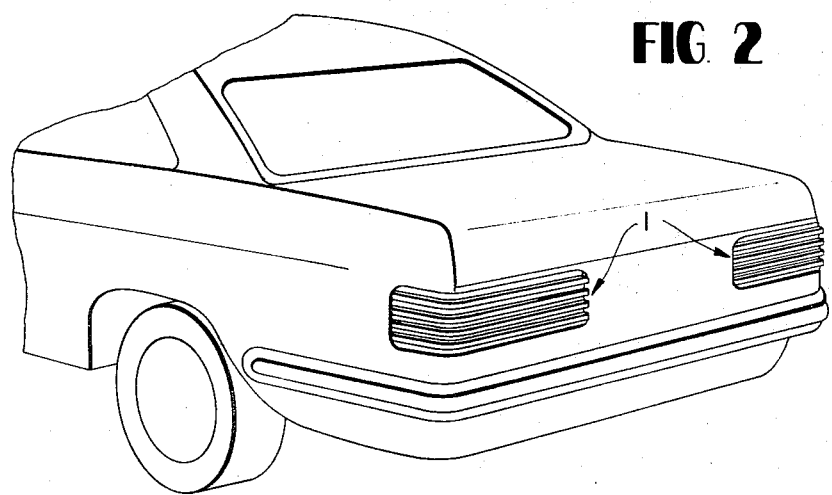
FIG. 2 is a perspective view obliquely from the left rear onto the rear portion of the vehicle of FIG. 1.
Figure 3:
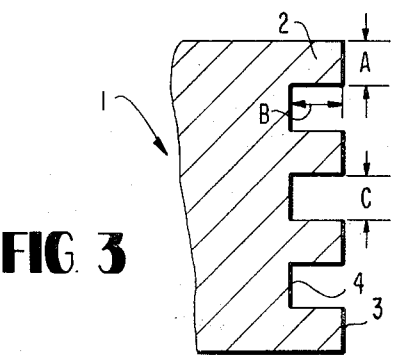
FIG. 3 is a partial vertical cross-sectional view through a cover pane according to the present invention, on an enlarged scale and taken at right angle to the outer surface of the pane.

Referring now to the drawing wherein like reference numerals are used throughout the various views to designate like parts, the cover pane in accordance with the present invention generally designated by reference numeral 1 which is shown in the three views of the drawing is constructed meander-shaped, as viewed in vertical cross section according to FIG. 3 so that projecting ribs 2 and recessed vertical surfaces 4 which are recessed with respect to the vertical outer surfaces 3 thereof result whereby the surfaces 4 remain practically free of dirt also after longer drives on dirty roads. The air flow occurring during the drive is indicated in FIG. 1 by arrows.

Tests have indicated that the dimension A of FIG. 3 should preferably be about 20 to about 30 mm., the dimension of B should be about 25 to about 30 mm., and the dimension C should also be about 25 to about 30 mm.

The rear pane 1 in accordance with the present invention may also be so constructed that it can be readily mounted over an existing substantially flat rear light pane, thus permitting existing types of vehicles to benefit by the present invention.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A cover pane for rear lights of vehicles, especially of motor vehicles, characterized in that it has a plurality of ribs projecting from a first recessed surface of said pane, said ribs being separated from each other by a prescribed distance in a first direction, the outer surface of each rib having a prescribed dimension parallel to said first direction, and wherein the separation between a pair of adjacent ones of said ribs at the outer surfaces thereof bears a specific relationship relative to the distance that said ribs project from said first recessed surface of said pane sufficient to prevent dirt particles thrown out of eddy or vortex flows formed at the rear end of said vehicles from impinging upon and covering said recessed surfaces, said specific relationship being in a range of about 5:6 to about 6:5.

2. A cover pane according to claim 1, wherein said specific relationship is about 5:6.

3. A cover pane according to claim 1, wherein said first recessed surface of said pane forms about one half the total surface area of said pane.

4. A cover pane according to claim 1, wherein each rib of said plurality is approximately rectangular in shape.

5. A cover pane according to claim 4, further comprising a plurality of recessed grooves, each said groove formed by said first recessed surface between said pair of adjacent ones of said ribs.

6. A cover pane according to claim 5, wherein each said recessed groove is rectangularly shaped.

7. A cover pane according to claim 4, wherein said prescribed dimension of said outer surface of each said rib is approximately 20 to about 30 mm, said separation between a pair of adjacent one of said ribs is a dimension of approximately 25 to about 30 mm, and said distance that said ribs project from said first recessed surface is a dimension of approximately 25 to about 30 mm.

8. A cover pane according to claim 4, wherein said distance that said ribs project from said first recessed surface is approximately 25 mm and said separation between a pair of adjacent ones of said ribs is about at least the same order of magnitude as said distance of projecting ribs.

9. A cover pane according to claim 1, wherein the cover pane is mounted over a vehicle rear lamp and said first direction is approximately vertical.

10. A cover pane according to claim 9, wherein said plurality of ribs extend in a second direction perpendicular to said first direction.

11. A cover pane according to claim 10, wherein said second direction is horizontal.

12. A cover pane according to claim 1, wherein the outer surface of each said rib is in the same plane as the outer surface of each other rib of said plurality.

13. A cover pane according to claim 12, wherein the outer surface of each said rib is parallel with said first recessed surface.

* * * * *